US011654999B2

(12) United States Patent
Matsuzawa et al.

(10) Patent No.: US 11,654,999 B2
(45) Date of Patent: May 23, 2023

(54) REAR WHEEL BRAKING DEVICE FOR MOTORCYCLE

(71) Applicant: HONDA MOTOR CO., LTD., Tokyo (JP)

(72) Inventors: Mitsutaka Matsuzawa, Wako (JP); Masaki Nishimura, Wako (JP); Haruki Horikawa, Wako (JP); Hiroki Mori, Wako (JP); Hiroshi Okamura, Wako (JP); Kyotaro Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 565 days.

(21) Appl. No.: 16/797,977

(22) Filed: Feb. 21, 2020

(65) Prior Publication Data

US 2020/0307740 A1      Oct. 1, 2020

(30) Foreign Application Priority Data

Mar. 25, 2019   (JP) .............................. JP2019-057223

(51) Int. Cl.
  *B62L 1/00*      (2006.01)
  *F16D 55/22*   (2006.01)
  (Continued)

(52) U.S. Cl.
  CPC ................ *B62L 1/00* (2013.01); *B62K 11/04* (2013.01); *B62K 25/283* (2013.01); *B62L 1/005* (2013.01);
  (Continued)

(58) Field of Classification Search
  CPC .... B62L 1/00; B62L 1/005; F16D 2055/0008; F16D 55/22; F16D 65/0056;
  (Continued)

(56) References Cited

U.S. PATENT DOCUMENTS 4,667,760 A * 5/1987 Takimoto ................ B60T 1/065
                                                            180/370
4,719,984 A * 1/1988 Watanabe .............. B62K 5/027
                                                            180/370
(Continued)

FOREIGN PATENT DOCUMENTS

CN         101209743 A      7/2008
CN         101274657 A     10/2008
(Continued)

OTHER PUBLICATIONS

Japanese Office Action, dated Jan. 6, 2021, for Japanese Application No. 2019-057223, with an English translation.
Chinese Office Action and Search Report for Chinese Application No. 202010207327.1, deled Apr. 9, 2021, with English translation of the Office Action.
(Continued)

*Primary Examiner* — Pamela Rodriguez
(74) *Attorney, Agent, or Firm* — Birch, Stewart, Kolasch & Birch, LLP

(57) ABSTRACT

To provide a rear wheel braking device for a motorcycle that can reduce an unsprung mass and the number of pieces of components on the rear wheel side of a shaft drive type motorcycle. In a rear wheel braking device for a motorcycle transmitting a drive force of a power unit of a motorcycle to a rear wheel through a drive shaft that extends in a vehicle longitudinal direction, the drive shaft includes a propeller shaft that is connected to a rear end of an output shaft through a universal joint, the output shaft protruding to the vehicle body rear side from a case member of the power unit. A brake disk is attached to the output shaft, the brake disk being braked by a rear wheel brake caliper. The rear wheel brake caliper is fixed to a bracket that is arranged in the case member, and is disposed on the vehicle body upper side of the brake disk.

12 Claims, 13 Drawing Sheets

(51) Int. Cl.

| | |
|---|---|
| *F16D 65/00* | (2006.01) |
| *B62M 7/06* | (2006.01) |
| *B62M 17/00* | (2006.01) |
| *B62K 11/04* | (2006.01) |
| *B62K 25/28* | (2006.01) |
| *F16C 3/03* | (2006.01) |
| *F16D 3/12* | (2006.01) |
| *F16D 65/847* | (2006.01) |
| *B62M 7/04* | (2006.01) |
| *F16D 55/00* | (2006.01) |

(52) U.S. Cl.
CPC ............... *B62M 7/04* (2013.01); *B62M 7/06* (2013.01); *B62M 17/00* (2013.01); *F16C 3/03* (2013.01); *F16D 3/12* (2013.01); *F16D 55/22* (2013.01); *F16D 65/0056* (2013.01); *F16D 65/0068* (2013.01); *F16D 65/0081* (2013.01); *F16D 65/847* (2013.01); *F16C 2326/06* (2013.01); *F16D 2055/0008* (2013.01); *F16D 2055/0016* (2013.01); *F16D 2055/0037* (2013.01)

(58) Field of Classification Search
CPC ...... F16D 65/0068; F16D 3/12; F16D 65/847; F16D 65/0081; F16D 2055/0037; F16D 2055/0016; B62M 7/06; B62M 17/00; B62M 7/04; B62K 11/04; B62K 25/283; F16C 3/03; F16C 2326/06
See application file for complete search history.

(56) References Cited

U.S. PATENT DOCUMENTS

| | | | |
|---|---|---|---|
| 6,923,293 B1 * | 8/2005 | James | ................ F16D 55/00 188/18 A |
| 2010/0009763 A1 | 1/2010 | Martinek et al. | |
| 2019/0061450 A1 | 2/2019 | Hayashi et al. | |

FOREIGN PATENT DOCUMENTS

| | | |
|---|---|---|
| CN | 101537872 A | 9/2009 |
| CN | 106763338 A | 5/2017 |
| CN | 207536086 U | 6/2018 |
| JP | 58-141979 A | 8/1983 |
| JP | 58-196232 U | 12/1983 |
| JP | 60-50084 A | 3/1985 |
| JP | 60-13878 B2 | 4/1985 |
| JP | 60-154972 A | 8/1985 |
| JP | S60-226381 A | 11/1985 |
| JP | 61-18181 A | 1/1986 |
| JP | 61-98687 A | 5/1986 |
| JP | 2-60093 U | 5/1990 |
| JP | 11-336802 A | 12/1999 |
| JP | 2010-19419 A | 1/2010 |
| JP | 2016-186343 A | 10/2016 |
| JP | 2016-203943 A | 12/2016 |
| JP | 2019-38303 A | 3/2019 |

OTHER PUBLICATIONS

German Office Action for German Application No. 10 2020 107 095.0 dated Feb. 27, 2023 with an English translation.

* cited by examiner

REAR WHEEL BRAKING DEVICE FOR MOTORCYCLE

TECHNICAL FIELD

The present invention relates to a rear wheel braking device for a motorcycle, and relates specifically to a rear wheel braking device for a motorcycle configured with a brake disk and a brake caliper that brakes the brake disk.

BACKGROUND ART

Conventionally, it is general to dispose a rear wheel braking device for a motorcycle in the vicinity of an axle of a rear wheel that is suspended from a vehicle body through a cushion unit. On the other hand, there has been known a configuration of disposing a rear wheel braking device at a position close to a power source of a motorcycle in order to reduce the weight of the downstream side of the cushion unit which is so-called an unsprung mass.

Patent Document 1 discloses a configuration that in a motorcycle which transmits a drive force of an engine to a rear wheel by a drive chain, an output shaft directed to the vehicle width direction with a drive sprocket being fixed thereto is made to protrude from a crankcase wall on the other side, and that a brake disk is attached to this extension portion.

CITATION LIST

Patent Literature

Patent Document 1: JP S60-154972 A

SUMMARY OF INVENTION

Technical Problem

However, the technology of Patent Document 1 is to be applied to a chain drive type motorcycle, and application to a shaft drive type motorcycle has not been studied, a drive force of an engine being transmitted to a rear wheel by a drive shaft that is directed in the vehicle longitudinal direction in the shaft drive type motorcycle.

The object of the present invention is to provide a rear wheel braking device for a motorcycle that can solve the problem of the prior art described above and can reduce the unsprung mass and the number of piece of components on the rear wheel side of a shaft drive type motorcycle.

Solution to Problem

To achieve the afore-mentioned object, the present invention has a first feature in that in a rear wheel braking device for a motorcycle transmitting a drive force of a power unit (P) of a motorcycle (1) to a rear wheel (WR) through a drive shaft (45) that extends in a vehicle longitudinal direction, the drive shaft (45) includes a propeller shaft (46) that is connected to the rear end of an output shaft (42) through a universal joint (43), the output shaft (42) protruding to a vehicle body rear side from a case member (34) of the power unit (P), and a brake disk (40) is attached to the output shaft (42), the brake disk (40) being braked by a brake caliper (41).

To achieve the afore-mentioned object, the present invention has a second feature in that the brake caliper (41) is fixed to a bracket (50) that is arranged in the case member (34).

To achieve the afore-mentioned object, the present invention has a third feature in that the power unit (P) is suspended by a body frame (F) that is configured to include a pair of left and right main frames (F2), the main frames (F2) extending in the vehicle longitudinal direction on an upper side of the power unit (P), and the brake caliper (41) is disposed on the vehicle body upper side of the brake disk (40).

To achieve the afore-mentioned object, the present invention has a fourth feature in that a pivot frame (F3) is connected to a rear side of the main frame (F2), a pivot (12) being arranged in the pivot frame (F3), the pivot (12) pivotally supporting a swing arm (13) in a swingable manner, the swing arm (13) supporting the rear wheel (WR), and the brake caliper (41) is disposed in a space that is surrounded by the case member (34), the main frame (F2), and the pivot frame (F3).

To achieve the afore-mentioned object, the present invention has a fifth feature in that the brake caliper (41) is disposed below the upper surface of the power unit (P).

To achieve the afore-mentioned object, the present invention has a sixth feature in that the drive shaft (45) includes a damper unit (44) that connects the output shaft (42) and the propeller shaft (46) to each other, the damper unit (44) includes an outer shaft (61) and an inner shaft (60), a drive force being transmitted to the outer shaft (61) from the output shaft (42), the inner shaft (60) transmitting a drive force of the outer shaft (61) to the downstream side, and a damper member (62) is disposed between the outer shaft (61) and the inner shaft (60).

To achieve the afore-mentioned object, the present invention has a seventh feature in that the damper capacity of the damper member (62) is set so that the reverse rotation side acting at a time of deceleration becomes smaller compared to the normal rotation side acting at the time of acceleration.

To achieve the afore-mentioned object, the present invention has an eighth feature in that a cooling fin (70) is attached to the output shaft (42), the cooling fin (70) rotating synchronously with the output shaft (42) and cooling the brake disk (40).

To achieve the afore-mentioned object, the present invention has a ninth feature in that a cover member (95) is arranged on an outer side in the vehicle width direction of the brake disk (40), the cover member (95) covering the brake disk (40).

Effects of the Invention

According to the first feature of the present invention, in a rear wheel braking device for a motorcycle transmitting a drive force of a power unit (P) of a motorcycle (1) to a rear wheel (WR) through a drive shaft (45) that extends in a vehicle longitudinal direction, the drive shaft (45) includes a propeller shaft (46) that is connected to the rear end of an output shaft (42) through a universal joint (43), the output shaft (42) protruding to a vehicle body rear side from a case member (34) of the power unit (P), and a brake disk (40) is attached to the output shaft (42), the brake disk (40) being braked by a brake caliper (41). Therefore, the brake disk and the brake caliper configuring the rear wheel braking device are disposed in the vicinity of the power unit, thereby the unsprung mass around the rear wheel is reduced, and road surface followability of the rear wheel can be improved. Also, since the mass is concentrated, kinetic performance of the motorcycle is improved. Further, since the brake hose supplying hydraulic pressure to the brake caliper is not required to be laid to the vicinity of the rear wheel, the brake hose can be shortened, the hose clamp and the like can be reduced, and the number of piece of components and the weight can be reduced.

According to the second feature of the present invention, the brake caliper (41) is fixed to a bracket (50) that is arranged in the case member (34). Therefore, the bracket supporting the brake caliper is arranged in the crankcase having high rigidity, thereby joining rigidity of the brake caliper is enhanced, assembling accuracy is improved, and the braking force of the brake and the operation feeling can be improved.

According to the third feature of the present invention, the power unit (P) is suspended by a body frame (F) that is configured to include a pair of left and right main frames (F2), the main frames (F2) extending in the vehicle longitudinal direction on an upper side of the power unit (P), and the brake caliper (41) is disposed on the vehicle body upper side of the brake disk (40). Therefore, the brake caliper can be disposed utilizing a space between the main frame and the power unit, and the mass can be concentrated. Also, the opening of the brake caliper comes to be directed vehicle body downward, and the brake caliper can be protected against moisture, dust, and the like.

According to the fourth feature of the present invention, a pivot frame (F3) is connected to a rear side of the main frame (F2), a pivot (12) being arranged in the pivot frame (F3), the pivot (12) pivotally supporting a swing arm (13) in a swingable manner, the swing arm (13) supporting the rear wheel (WR), and the brake caliper (41) is disposed in a space that is surrounded by the case member (34), the main frame (F2), and the pivot frame (F3). Therefore, the front and rear as well as the upper portion of the brake disk and the brake caliper can be protected by the case member, the main frame, and the pivot frame.

According to the fifth feature of the present invention, the brake caliper (41) is disposed below the upper surface of the power unit (P). Therefore, the brake caliper can be disposed without affecting the volume of the air cleaner and the fuel tank, the air cleaner and the fuel tank being disposed above the engine.

According to the sixth feature of the present invention, the drive shaft (45) includes a damper unit (44) that connects the output shaft (42) and the propeller shaft (46) to each other, the damper unit (44) includes an outer shaft (61) and an inner shaft (60), a drive force being transmitted to the outer shaft (61) from the output shaft (42), the inner shaft (60) transmitting a drive force of the outer shaft (61) to the downstream side, and a damper member (62) is disposed between the outer shaft (61) and the inner shaft (60). Therefore, the shock in transmitting a drive force to the propeller shaft can be reduced by arranging the damper unit.

According to the seventh feature of the present invention, the damper capacity of the damper member (62) is set so that the reverse rotation side acting at a time of deceleration becomes smaller compared to the normal rotation side acting at the time of acceleration. Therefore, the shock at a time of acceleration can be relaxed, and a brake feeling with excellent response can be secured at the time of deceleration. Also, when the difference of the damper capacity is increased to the maximum, namely when the damper capacity on the deceleration side is made zero, the time lag at the time of the braking operation can be further reduced as much as possible.

According to the eighth feature of the present invention, a cooling fin (70) is attached to the output shaft (42), the cooling fin (70) rotating synchronously with the output shaft (42) and cooling the brake disk (40). Therefore, the cooling fin is turned by a rotational force of the output shaft, and the brake disk can be cooled. Also, since the cooling fin is disposed closely to the brake disk, the cooling efficiency can be improved.

According to the nineth feature of the present invention, a cover member (95) is arranged on an outer side in the vehicle width direction of the brake disk (40), the cover member (95) covering the brake disk (40). Therefore, even when the brake disk protrudes outward in the vehicle width direction beyond the case member, interference with the foot of the occupant can be prevented by arranging the cover member. Also, the outer side in the vehicle width direction of the brake disk and the brake caliper can be protected against a flying stone, moisture, and the like, and the brake dust generated in braking can be prevented from being scattered to the outer side in the vehicle width direction.

DESCRIPTION OF EMBODIMENT

Figure 1:
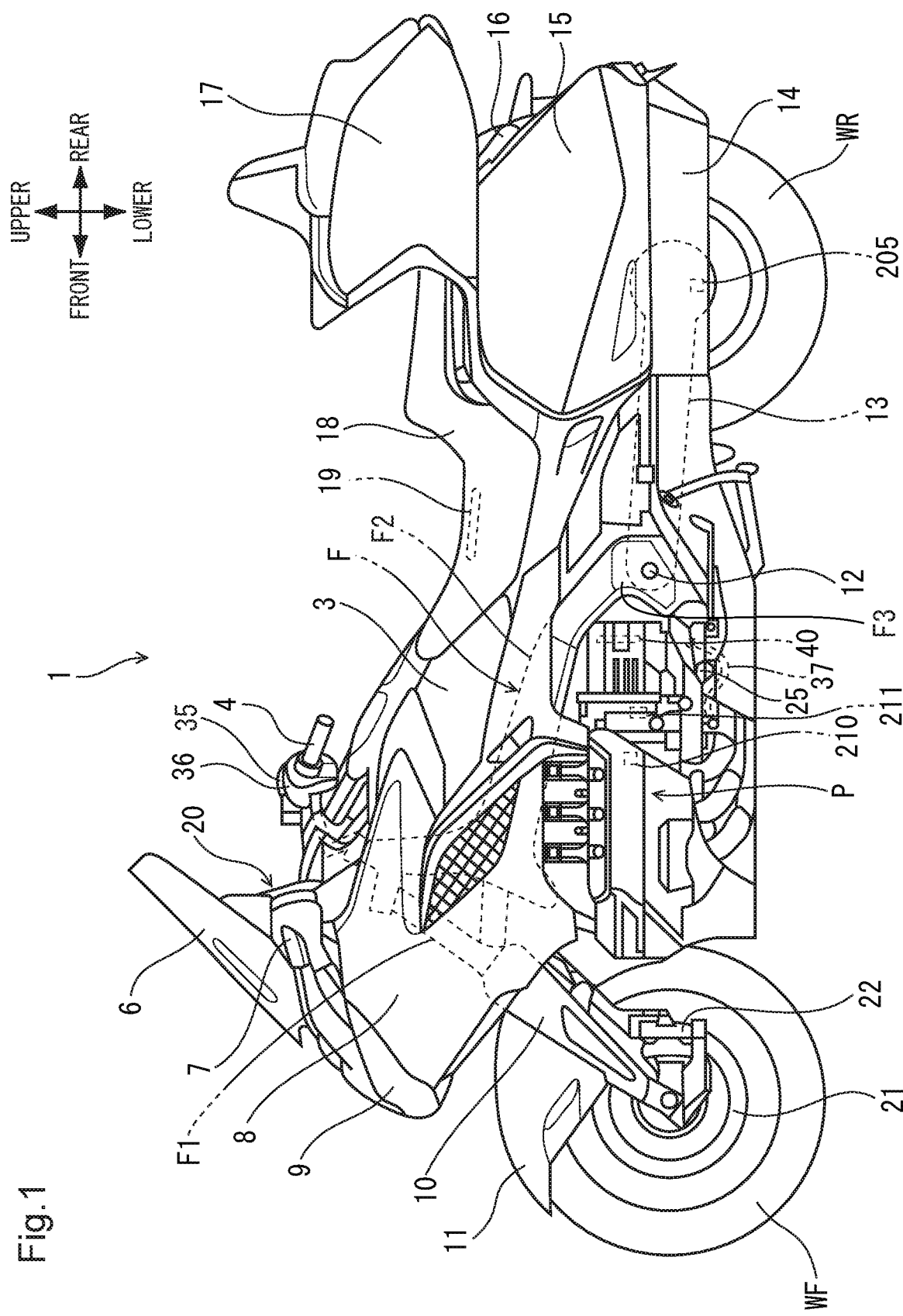
FIG. 1 is a left side view of a motorcycle to which a rear wheel braking device related to an embodiment of the present invention is applied.

Hereinafter, preferable embodiments of the present invention will be explained in detail referring to the drawings. FIG. 1 is a left side view of a motorcycle 1 to which a rear wheel braking device related to an embodiment of the present invention is applied. The motorcycle 1 is a saddled vehicle that transmits a drive force of a power unit P to a rear wheel WR through a drive shaft. A head pipe F1 is supported by the front end portion of main frames F2 in a vertically movable manner, the head pipe F1 swingably supporting a front arm 10 that pivotally supporting a front wheel WF, the main frames F2 configuring a body frame F. Steering handlebars 4 are pivotally supported by the front upper end of the body frame F in a swingable manner, the steering handlebars 4 being connected to a front arm 10 through a link mechanism. To the front arm 10, a front fender 11 and a front wheel brake caliper 22 are attached, the front fender 11 covering the upper side of the front wheel WF, the front wheel brake caliper 22 braking a front wheel brake disk 21 that rotates integrally with the front wheel WF.

To the lower portion of the rear end of a pair of the left and right main frames F2, pivot frames F3 are connected, a pivot 12 being arranged in the pivot frame F3, the pivot 12 pivotally supporting the front end of a swing arm 13 in a swingable manner. On the front lower side of the pivot frames F3, a pair of left and right foot placing steps 25 are disposed by a rider placing his/her feet on the foot placing steps 25. Also, in the vicinity of the foot placing step 25 on the right side in the vehicle width direction, a brake pedal 37 is disposed, the brake pedal 37 activating a rear wheel brake. A drive shaft is inserted to the inner portion of the swing arm 13 that has a hollow structure.

The vehicle body front side of the head pipe F1 is covered by a front cowl 8 that supports a windshield 6 and a head light 9. A pair of left and right front flasher lamp integrated type rearview mirror devices 7 is disposed in the front cowl 8, and a meter device 20 is disposed at a position on the vehicle front side of the steering handlebars 4 and on the rear side of the windshield 6. Switch boxes 35, 36 are attached to the left and right steering handlebars 4, plural switches being arranged in the switch boxes 35, 36.

A fuel tank cover 3 is disposed on the vehicle body upper side of the main frames F2, and a front-rear integrated type seat 18 is disposed behind the fuel tank cover 3, the rider and a passenger sitting on the seat 18. At a position close to the front of the seat 18, a seating sensor 19 having a thin sheet shape is arranged in the inside, the seating sensor 19 detecting the sitting state of the rider.

The power unit P is suspended from the lower portion of the body frame F, the power unit P being configured with a horizontally opposed six-cylinder engine and a stepped transmission in an integral manner, and combustion gas of the engine is discharged from the rear end of a muffler 14 on the vehicle body rear side. An engine speed sensor 210 and a neutral sensor 211 are arranged in the power unit P, the engine speed sensor 210 detecting the engine speed, the neutral sensor 211 detecting whether the transmission is at a neutral position of non-in-gear state. Also, a vehicle speed sensor 205 is arranged at the rear end of the swing arm 13, the vehicle speed sensor 205 detecting vehicle speed V of the motorcycle 1 from the rotation state of the rear wheel WR.

The power unit P is configured to enable automatic speed change matching the vehicle speed V and the engine speed Ne without operating clutches and a shift pedal by automatically controlling two clutches and a shit drum, the two clutches being arranged on a main shaft of the transmission, the shit drum changing the engagement state of the shift gears. Thus, traveling in an automatic mode or a manual mode is enabled, the automatic mode not requiring the shifting operation, the manual mode allowing switching of the shift position by operation of the shift switch.

A top case 17 as a storage unit is disposed on the vehicle body rear side of the seat 18. A pair of left and right pannier cases 15 is attached to the vehicle body lower side of the top case 17, and a tail lamp device 16 including rear flasher lamps are disposed between the left and right pannier cases 15.

A rear wheel brake disk 40 is disposed at a position behind the power unit P and in front of the pivot frames F3, the rear wheel brake disk 40 configuring a rear wheel braking device related to the present invention.

Figure 2:
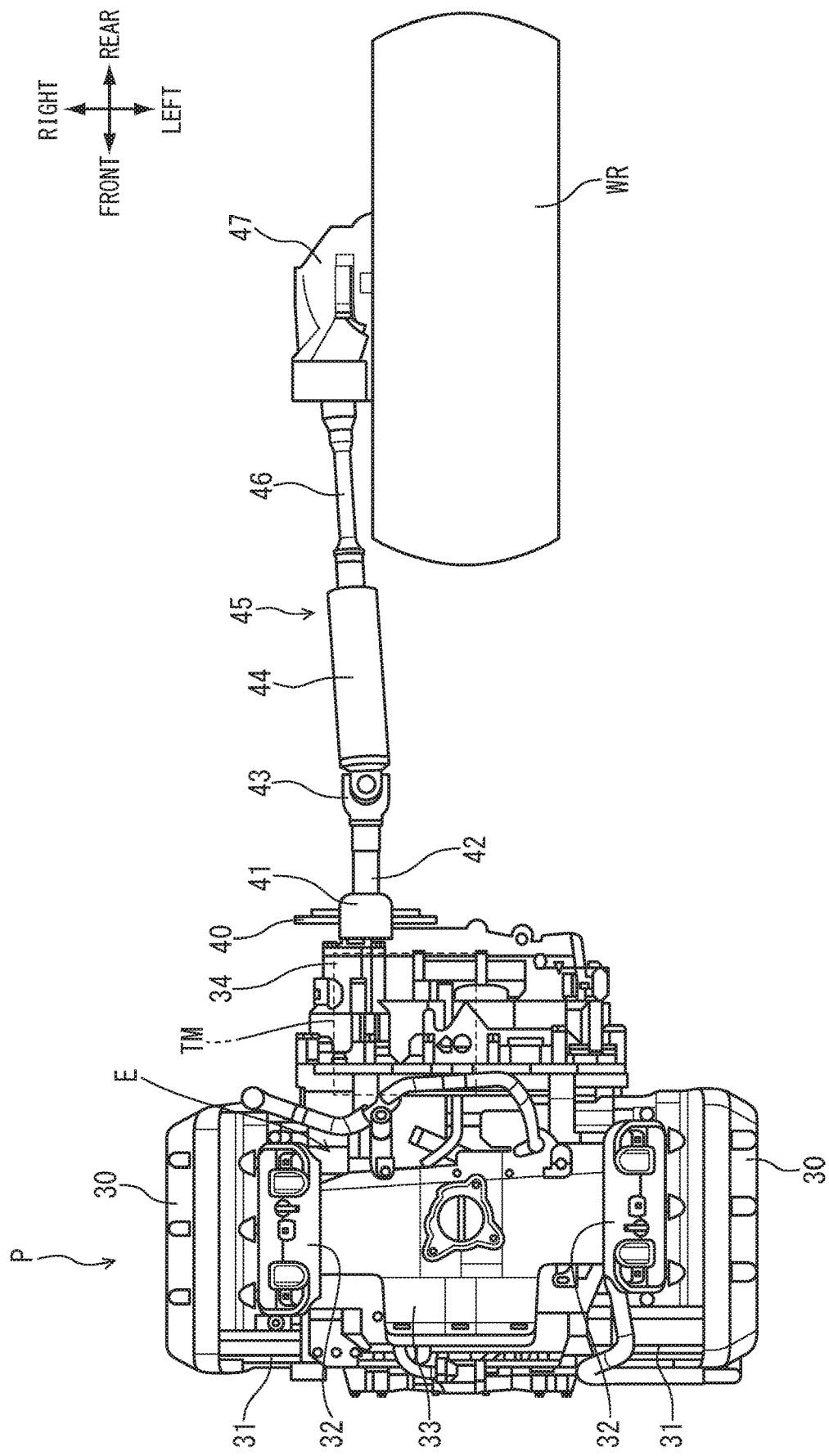
FIG. 2 is a plan view showing an overall configuration of a shaft drive mechanism that transmits a drive force of the power unit to the rear wheel.

FIG. 2 is a plan view showing an overall configuration of a shaft drive mechanism that transmits a drive force of the power unit P to the rear wheel WR. The power unit P is formed by configuring a horizontally opposed six-cylinder engine E and a transmission TM in an integral manner. A pair of left and right cylinder heads 31 is fixed to a crankcase 33 that is integral with the cylinder, the cylinder heads 31 protruding toward the outer side in the vehicle width direction. Cylinder head covers 30 are attached on the outer side in the vehicle width direction of the cylinder heads 31, and intake devices 32 are attached on the vehicle body upper side of the cylinder heads 31. A transmission case 34 as a case member storing the transmission TM is attached on the vehicle body rear side of the crankcase 33.

A drive force of the power unit P is transmitted to a drive shaft 45 from an output shaft 42 through a universal joint 43, the output shaft 42 protruding to the vehicle body rear side of the transmission case 34. The drive shaft 45 includes a damper unit 44 and a propeller shaft 46, the damper unit 44 being connected to the universal joint 43, the propeller shaft 43 being connected to the rear end of the damper unit 44. The rear end of the propeller shaft 43 is connected to a final gear case 47 that pivotally supports the rear wheel WR in a rotatable manner.

The rear wheel brake disk 40 configuring the rear wheel braking device related to the present invention is fixed to the output shaft 42, and a rear wheel brake caliper 41 braking the rear wheel brake disk 40 is fixed to the transmission case 34.

Figure 3:
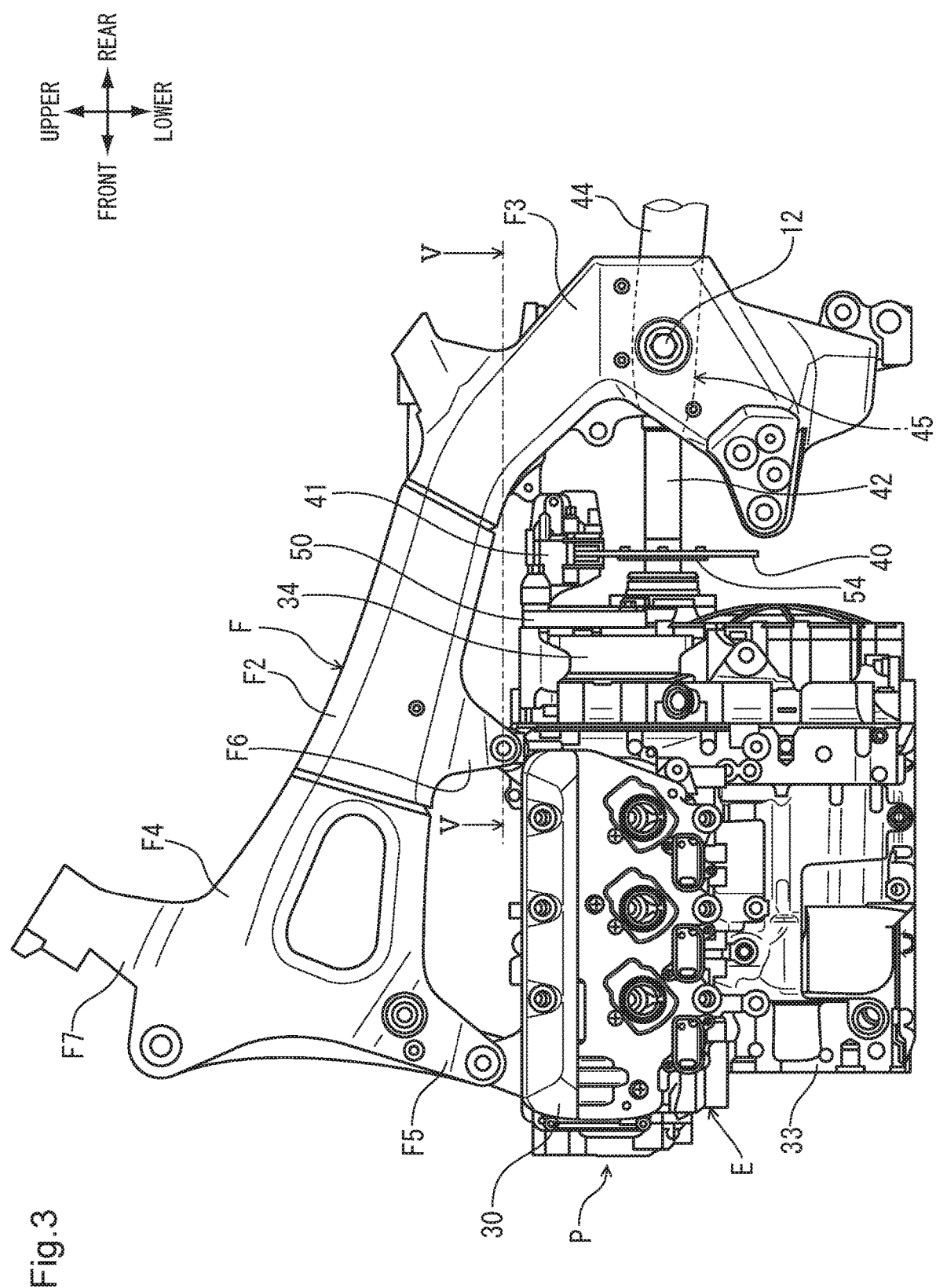
FIG. 3 is a left side view showing a configuration of the body frame and the power unit.

FIG. 3 is a left side view showing a configuration of the body frame F and the power unit P. The body frame F is configured to include a front frame F4, a pair of the left and right main frames F2, and the pivot frames F3, a support frame F7 being formed in the front frame F4, the support frame F7 pivotally supporting the steering handlebars 4 in a steerable manner, the main frames F2 extending downward to the rear of the vehicle body from the rear end of the front frame F4, the pivot frames F3 being connected to the rear end of the main frames F2 and supporting the pivot 12. The power unit P is suspended by a pair of front left and right mount portions F5 and a pair of rear left and right mount portions F6, the front mount portions F5 extending downward from the front frame F4, the rear mount portions F6 extending downward from the main frames F2.

As described above, the rear wheel brake disk 40 is fixed to the output shaft 42 through an attachment hub 54, the output shaft 42 protruding to vehicle body rearward from the transmission case 34, and a rear wheel brake caliper 41 is fixed to a bracket 50 that is attached to the transmission case 34. According to this configuration, a braking force is imparted to the output shaft 42 by activating the rear wheel brake caliper 41, and the rear wheel WR can be braked.

Also, since the rear wheel brake disk 40 and the rear wheel brake caliper 41 are disposed in the vicinity of the power unit P, the unsprung mass around the rear wheel WR is reduced, and the road surface followability of the rear wheel WR can be improved. Also, since the mass is concentrated, the kinetic performance of the motorcycle 1 is improved. Further, since it is not required to lay the brake hose to the vicinity of the rear wheel WR, the brake hose supplying hydraulic pressure to the rear wheel caliper, the brake hose can be shortened, the hose clamp and the like can be reduced, and the number of piece of components and the weight can be reduced.

On the other hand, the rear wheel brake caliper 41 comes to be disposed in a space that is surrounded by the transmission case 34, the main frames F2, and the pivot frames F3 in a vehicle body side view, the front, rear, and upper portions of the rear wheel brake disk 40 and the rear wheel brake caliper 41 can be protected. Also, since the rear wheel brake caliper 41 is disposed below the upper surface of the power unit P, the rear wheel brake caliper 41 can be disposed without affecting the volume of the air cleaner and the fuel tank disposed above the engine E.

Figure 4:
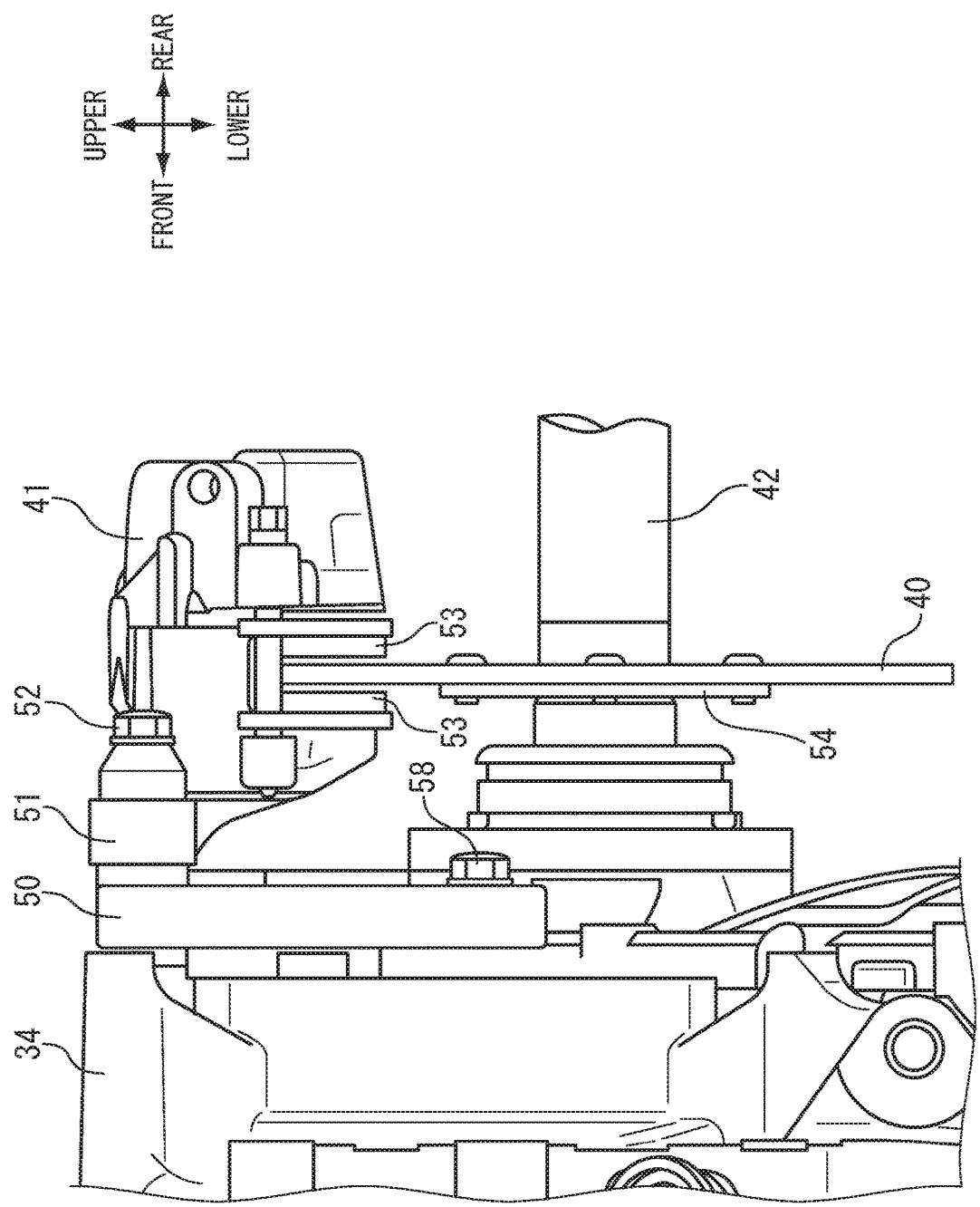
FIG. 4 is a partial enlarged view of FIG. 3.

FIG. 4 is a partial enlarged view of FIG. 3. The rear wheel brake caliper 41 is made to be of an oil hydraulic type where brake pads 53 are pressed to the rear brake disk 40 by the hydraulic pressure that is supplied according to operation of the brake pedal. Attachment stays 51 arranged in the left and right in the vehicle width direction of the rear wheel brake caliper 41 are fixed to the bracket 50 by a pair of left and right fastening members 52. The bracket 50 is attached to the transmission case 34 by a fastening member 58. Thus, since the rear wheel brake caliper 41 is attached to the transmission case 34 that has high rigidity, joining rigidity of the rear wheel brake caliper 41 is enhanced to improve the assembling accuracy, and the braking force of the brake and the operation feeling can be improved.

Also, since the rear wheel brake caliper 41 is disposed on the vehicle body upper side of the rear wheel brake disk 40, the opening portion of the rear wheel brake caliper 41 comes to be directed vehicle body downward, and the rear wheel brake caliper 41 can be protected against the moisture, dust, and the like.

Figure 5:
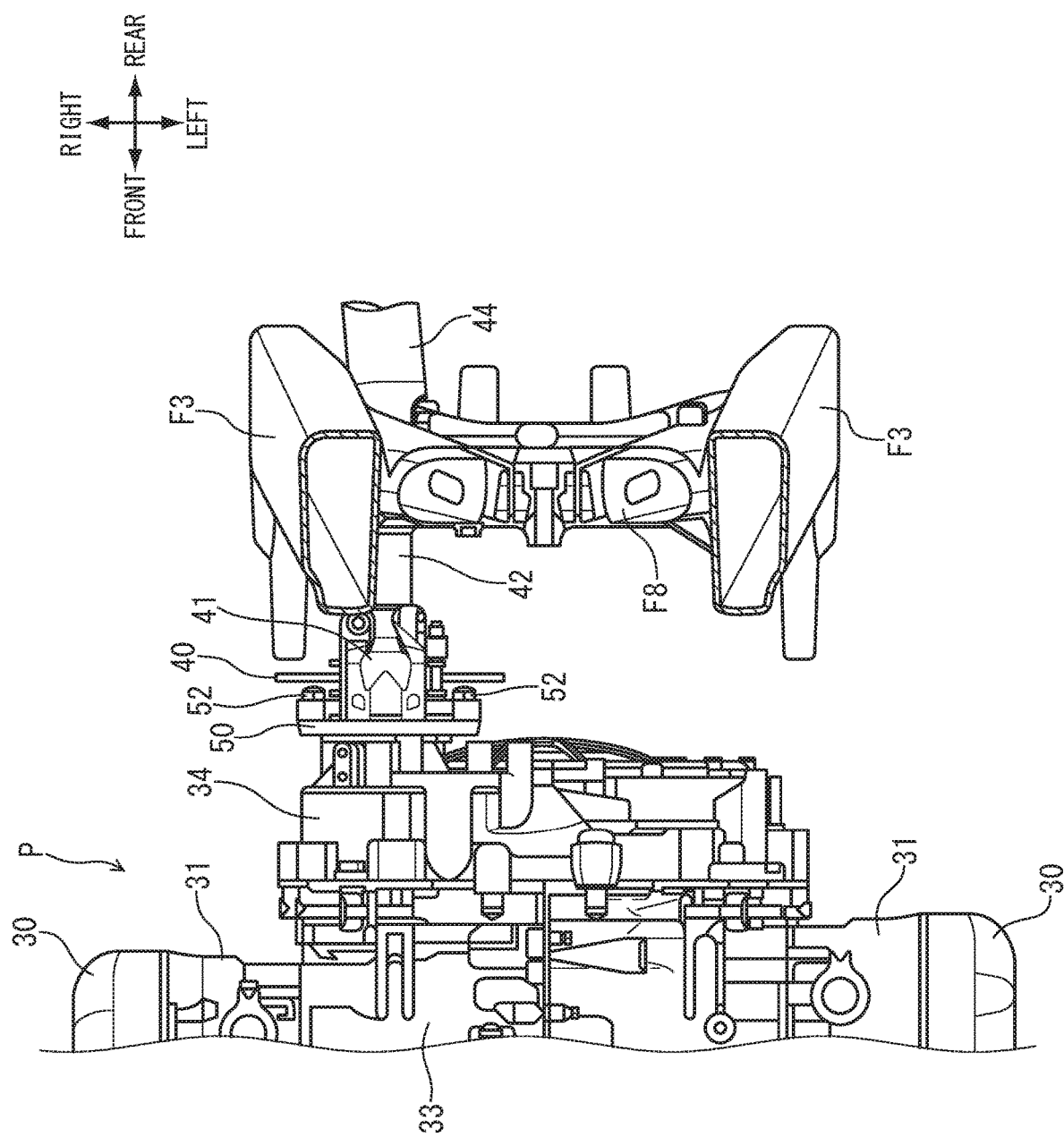
FIG. 5 is a cross-sectional view taken along the line V-V of FIG. 3.
Figure 6:
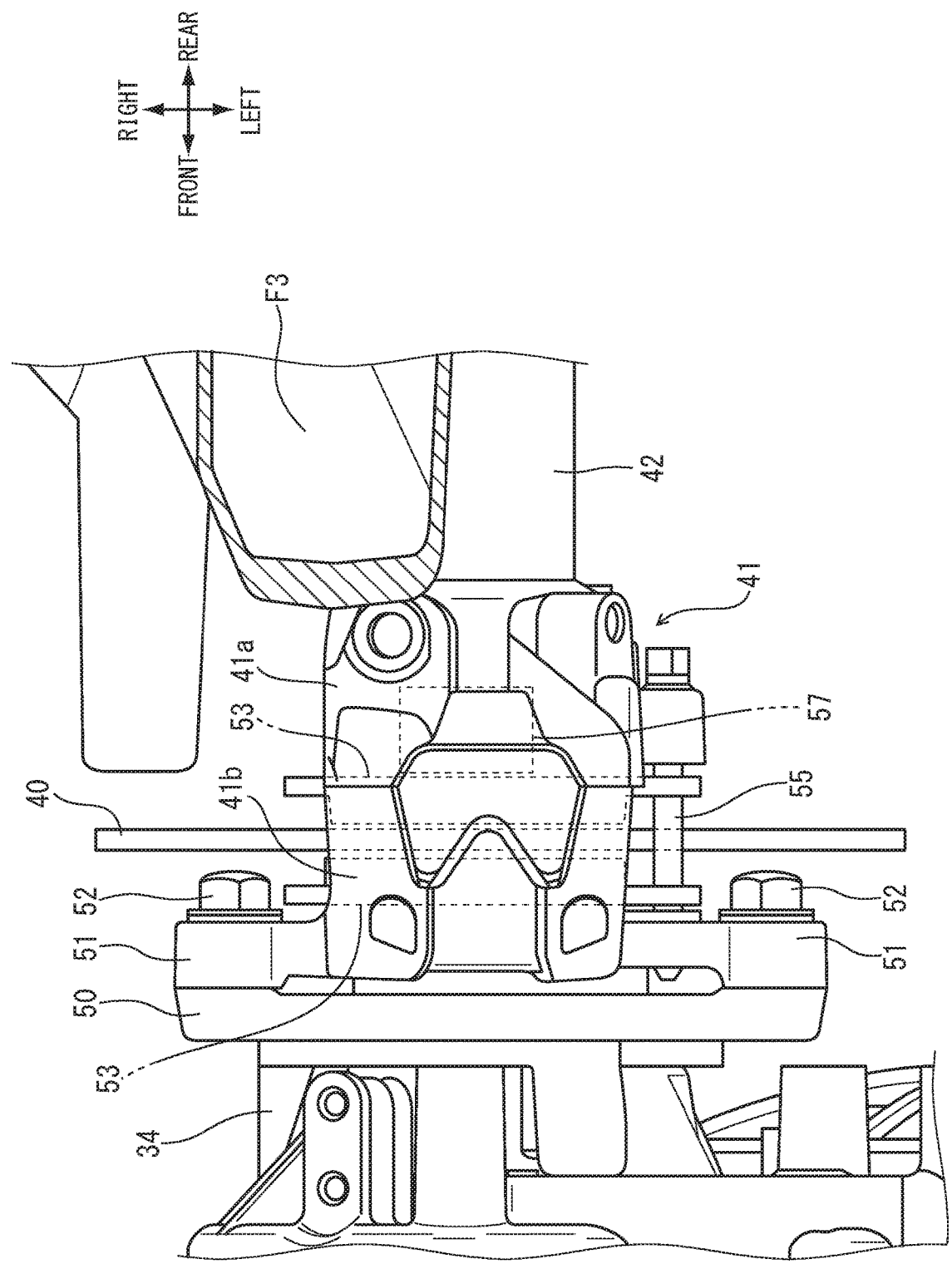
FIG. 6 is a partial enlarged view of FIG. 5.

FIG. 5 is a cross-sectional view taken along the line V-V of FIG. 3. Also, FIG. 6 is a partial enlarged view of FIG. 5. The output shaft 42 is disposed at a position close to the right side in the vehicle width direction of the transmission case 34. The left and right pivot frames F3 are connected to each other by a connection frame F8 that is directed in the vehicle width direction. The rear portion of the rear wheel brake disk 40 and the rear wheel brake caliper 41 comes to be also protected by this connection frame F8.

The rear wheel brake caliper 41 includes a rear half body 41a and a front half body 41b, the rear half body 41a storing a piston 57 that slidingly moves by hydraulic pressure, the front half body 41b being joined to the vehicle body front side of the rear half body 41a, and a pair of the left and right brake pads 53 are stored in an opening that is formed between the rear half body 41a and the front half body 41b. The brake pads 53 are supported by the rear wheel brake caliper 41 by way of a pad pin 55 on the left side in the vehicle width direction.

Figure 7:
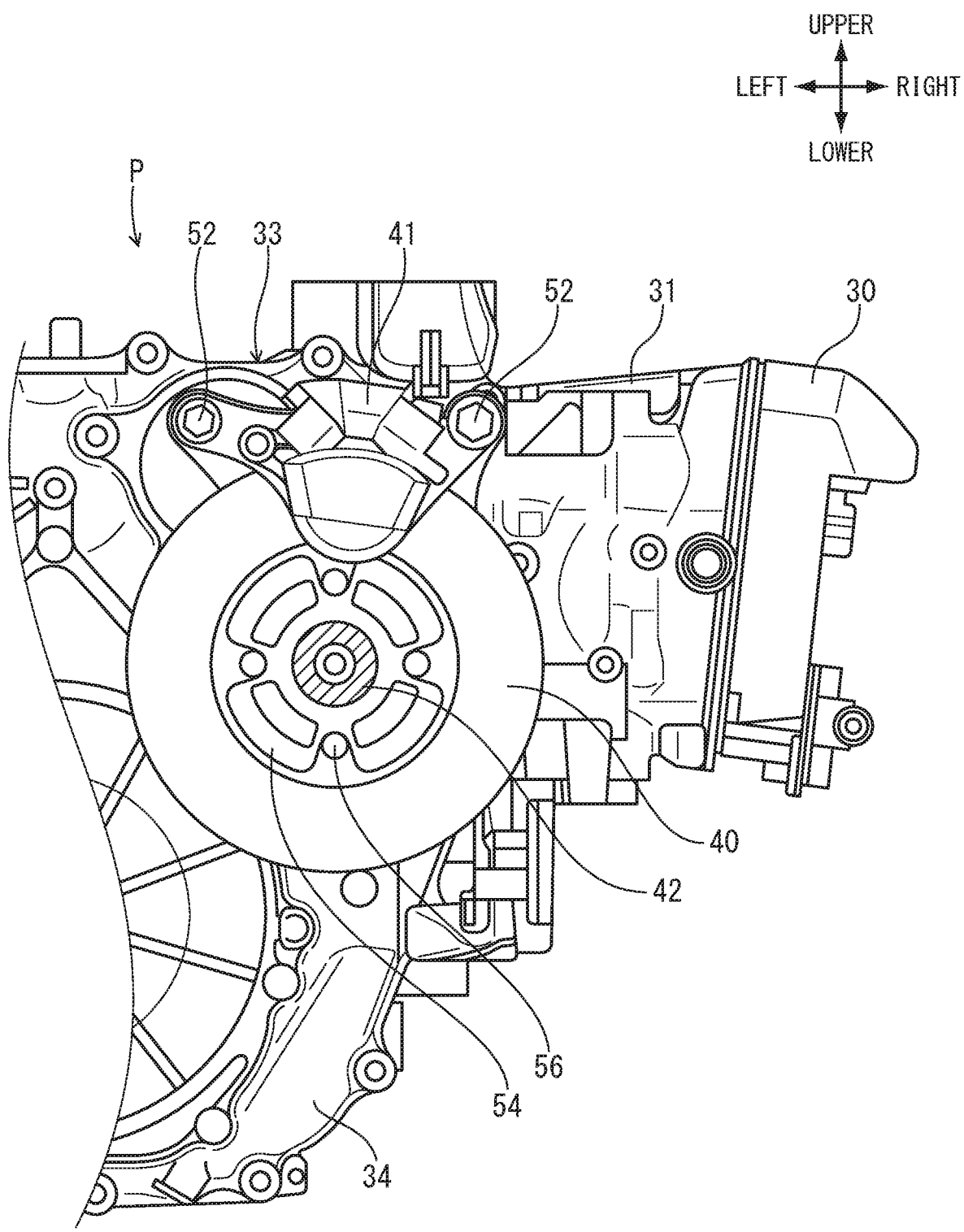
FIG. 7 is a rear view showing a configuration around the output shaft of the power unit.

FIG. 7 is a rear view showing a configuration around the output shaft 42 of the power unit P. The output shaft 42 is disposed at a low position close to the right side in the vehicle width direction of the transmission case 34 in order to insert the drive shaft 45 to an arm portion of the swing arm 13 that supports the rear wheel WR. The rear wheel brake disk 40 is set in the diameter of a range where the upper end of the rear wheel brake caliper 41 is positioned below the upper surface of the crankcase 33, the rear wheel brake disk 40 being supported by the attachment hub 54 by way of floating pins 56, the attachment hub 54 being fixed to the output shaft 42. Thus, the amount of extension outward in the vehicle width direction is also suppressed.

Figure 8:
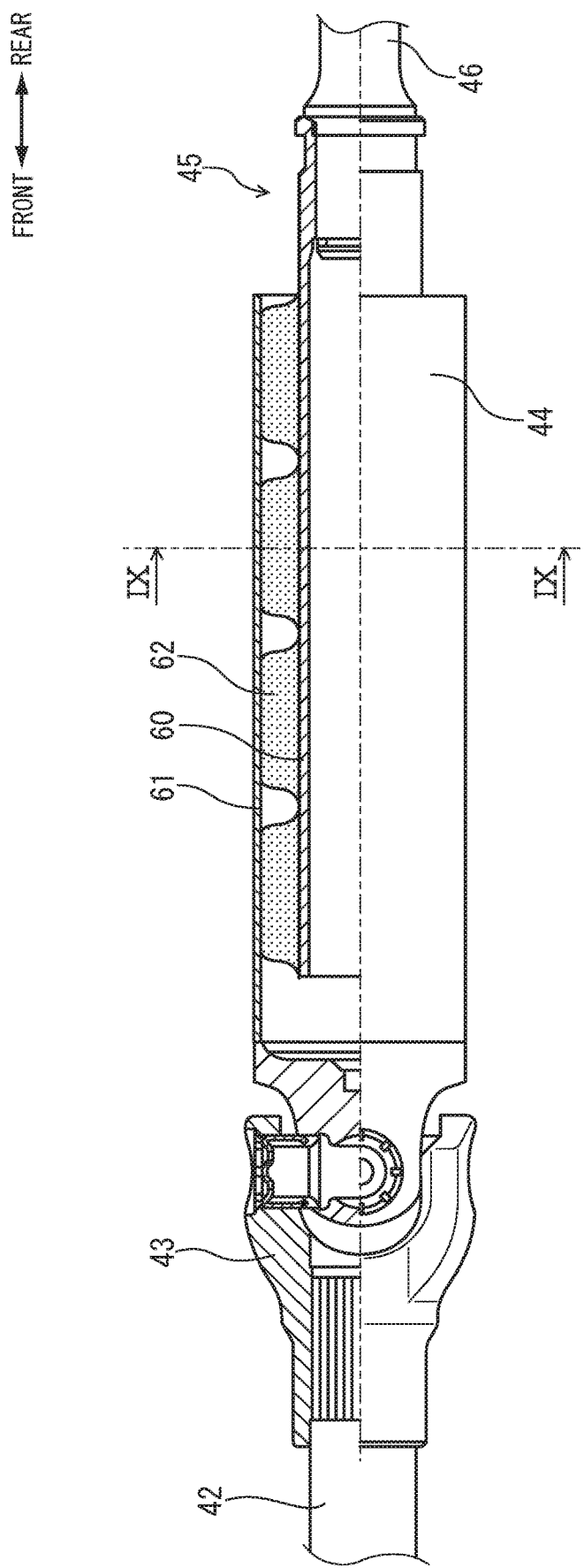
FIG. 8 is a partial cross-sectional plan view of the drive shaft.
Figure 9:
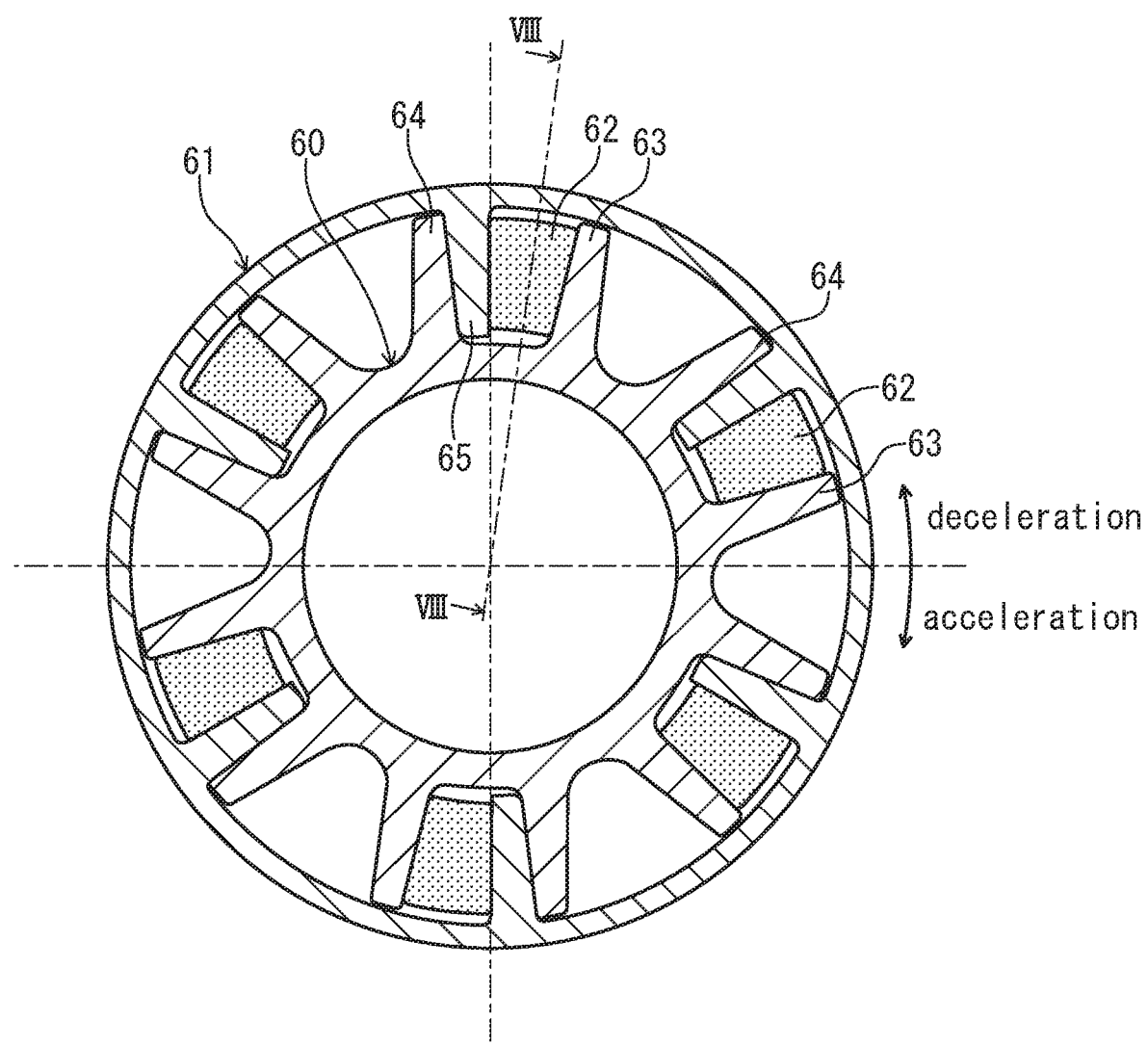
FIG. 9 is a cross-sectional view taken along the line IX-IX of FIG. 8.

FIG. 8 is a partial cross-sectional plan view of the drive shaft 45. Also, FIG. 9 is a cross-sectional view taken along the line IX-IX of FIG. 8. The cross-sectional portion shown in FIG. 8 corresponds to the line VIII-VIII cross section of FIG. 9. The drive shaft 45 is configured to include the damper unit 44 that connects the output shaft 42 and the propeller shaft 46 to each other. The damper unit 44 is configured to include an outer shaft 61, an inner shaft 60, and a damper member 62, the outer shaft 61 being connected to the universal joint 43 on the vehicle body front side, the inner shaft 60 transmitting a drive force of the outer shaft 61 to the propeller shaft 46, the damper member 62 being disposed between the outer shaft 61 and the inner shaft 60. The rear wheel brake disk 40 is attached to the output shaft 42 that is connected to the upstream side of the universal joint 43, the universal joint 43 connecting the drive shaft 45 in a swingable manner.

Referring to FIG. 9, on the inner circumferential surface of the outer shaft 61 formed of metal and the like, plural transmission plates 65 for transmitting a drive force of the power unit P are erected at in the radial direction at equal intervals. On the other hand, On the other hand, on the outer circumferential surface of the inner shaft 60 formed of metal and the like, acceleration side receive plates 63 and deceleration side receive plates 64 are erected respectively at equal intervals, the acceleration side receive plates 63 receiving a drive force of the acceleration side of the outer shaft 61, the deceleration side receive plates 64 receiving a drive force of the deceleration side of a case a braking force by the rear wheel braking device is generated or an engine brake is applied. These transmission plates 65, acceleration side receive plates 63, and deceleration side receive plates 64 respectively have a shape elongated in the axial direction.

According to the present embodiment, it is configured that plural damper members 62 formed of rubber and the like are disposed between the transmission plates 65 of the outer shaft 61 and the acceleration side receive plates 63 of the inner shaft 60 and that a gap is not generated between the transmission plates 65 and the deceleration side receive plates 64. According to this configuration, the shock at the time of acceleration can be relaxed, and brake feeling with excellent response not going through a damper can be secured at the time of deceleration. Also, according to this configuration, the difference between the damper capacity of the acceleration side (normal rotation side) and the damper capacity of the deceleration side (reverse rotation side) can be minimized by that the damper capacity of the deceleration side is made to be zero.

On the other hand, in order to differentiate the damper capacity of the acceleration side and the damper capacity of the deceleration side, damper members having a capacity smaller than the damper capacity of the acceleration side may be disposed at respective positions between the transmission plates 65 and the deceleration side receive plates 64. With this configuration also, braking feeling with excellent response can be secured while relaxing the shock of the time of acceleration.

Figure 10:
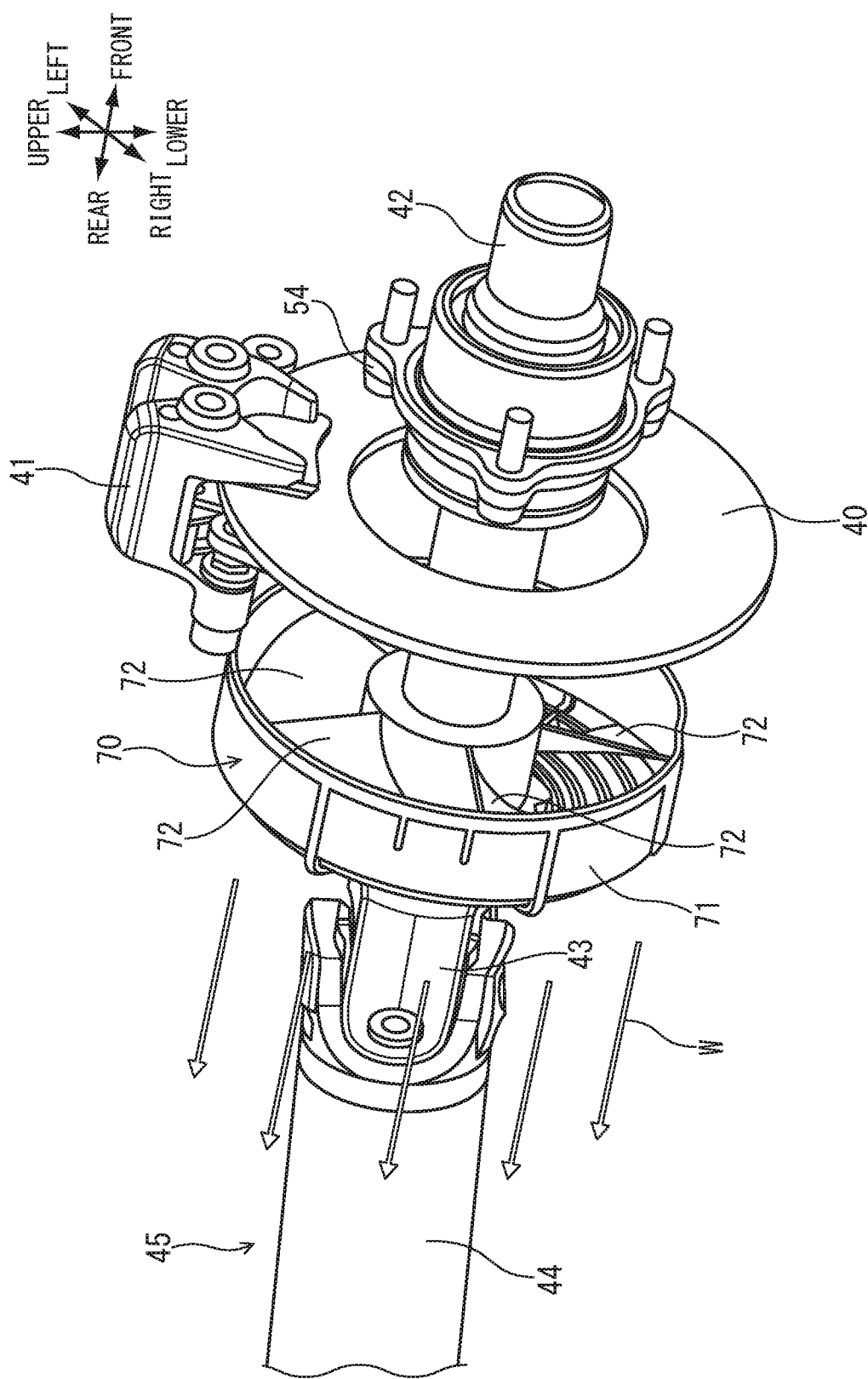
FIG. 10 is a perspective view showing a configuration of a rear wheel braking device related to a modification of the present embodiment.

FIG. 10 is a perspective view showing a configuration of a rear wheel braking device related to a modification of the present embodiment. As shown in FIG. 7, since the rear wheel brake disk 40 is disposed on the vehicle body rear side of the transmission case 34 and the cylinder heads 31, the air heated by the heat of the engine E is liable to hit the rear wheel brake disk 40. According to this modification, by fixing a cooling fin 70 to the output shaft 70, it is enabled to rotate the cooling fin 70 by a rotational force of the output shaft 70, and to positively cool the rear wheel brake disk 40.

The cooling fin 70 enables the air W to positively flow vehicle body rearward by rotating synchronously with the output shaft 42, the cooling fin 70 being provided with plural blade members 72 that are arranged in the inside of a cylindrical member 71. Although an example shown in the drawing is configured that the cooling fin 70 is disposed on the vehicle body rear side of the rear wheel brake disk 40 and that the traveling air from the vehicle body front side easily hits the front surface of the rear wheel brake disk 40, it may also be configured that the air positively fed by the cooling fin 70 hits the rear wheel brake disk 40 by disposing the cooling fin 70 on the vehicle body front side of the rear wheel brake disk 40.

Also, the cooling fin 70 may have such configuration that the cylindrical member 71 covers the outer side of the rear wheel brake disk 40 and the rear wheel brake caliper 41. Further, the rear wheel brake disk 40 may be of a ventilated type where an air blowing passage is formed between two sheets of disks.

Figure 11:
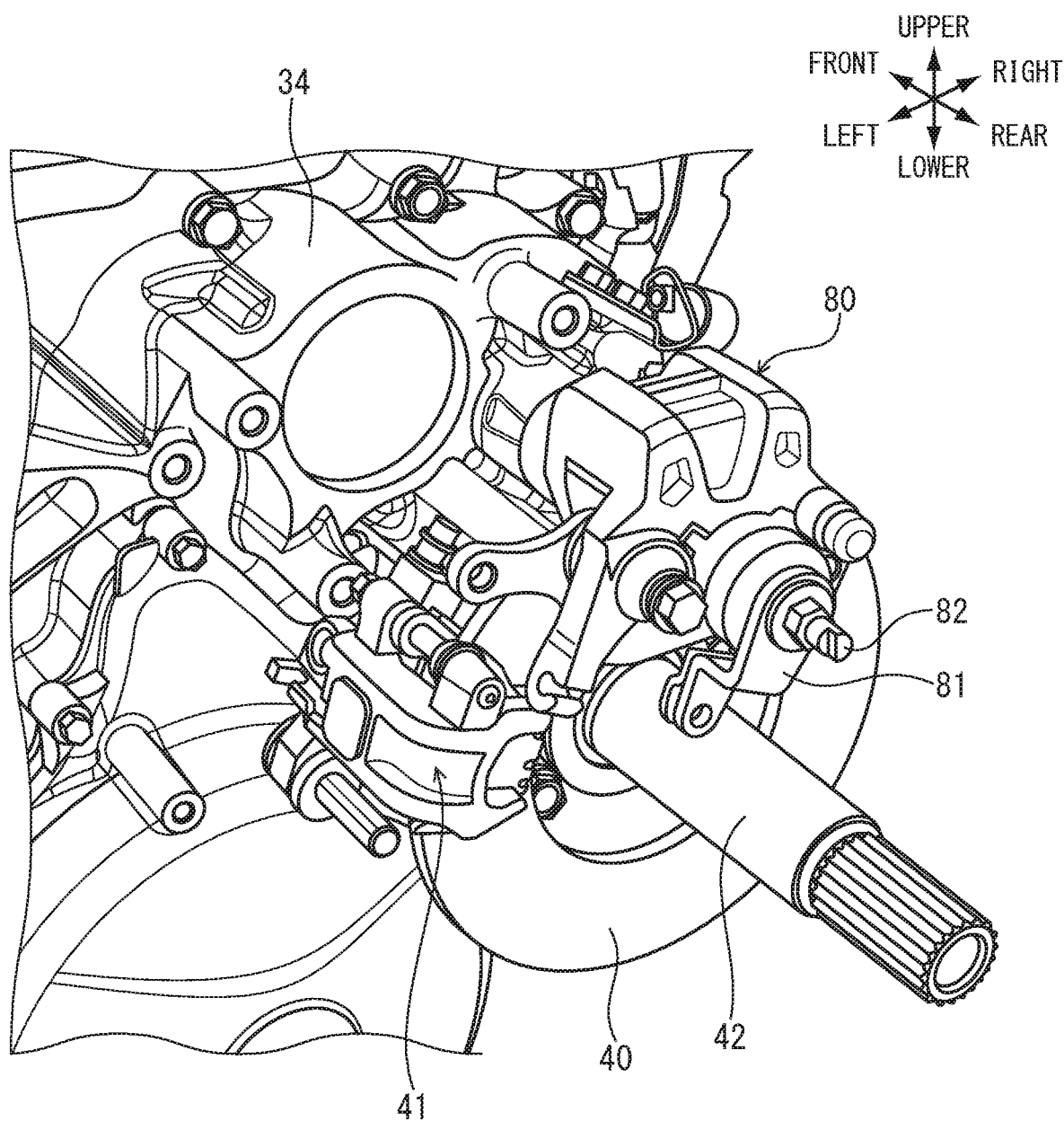
FIG. 11 is a perspective view showing a configuration of a rear wheel braking device related to the second embodiment of the present invention.

FIG. 11 is a perspective view showing a configuration of a rear wheel braking device related to the second embodiment of the present invention. The present embodiment is characterized that, in addition to the rear wheel brake caliper 41 as a regular brake used during traveling, a parking brake caliper 80 is attached to the transmission case 34, the parking brake caliper 80 continuously imparting a brake force to the rear wheel WR during parking. According to this configuration, the unsprung mass around the rear wheel WR can be reduced further.

In addition to a mechanical type where an operation shaft including a screw mechanism is turned by an arm member 81 to press the brake pad, the parking brake caliper 80 may be of an electromotive type where the brake pad is pressed by a drive force of a motor. According to the present embodiment, since the parking brake caliper 80 is disposed on the vehicle body upper side of the rear wheel brake disk 40, the rear wheel brake caliper 41 as a regular brake is disposed closely to the inner side in the vehicle width direction.

Figure 12:
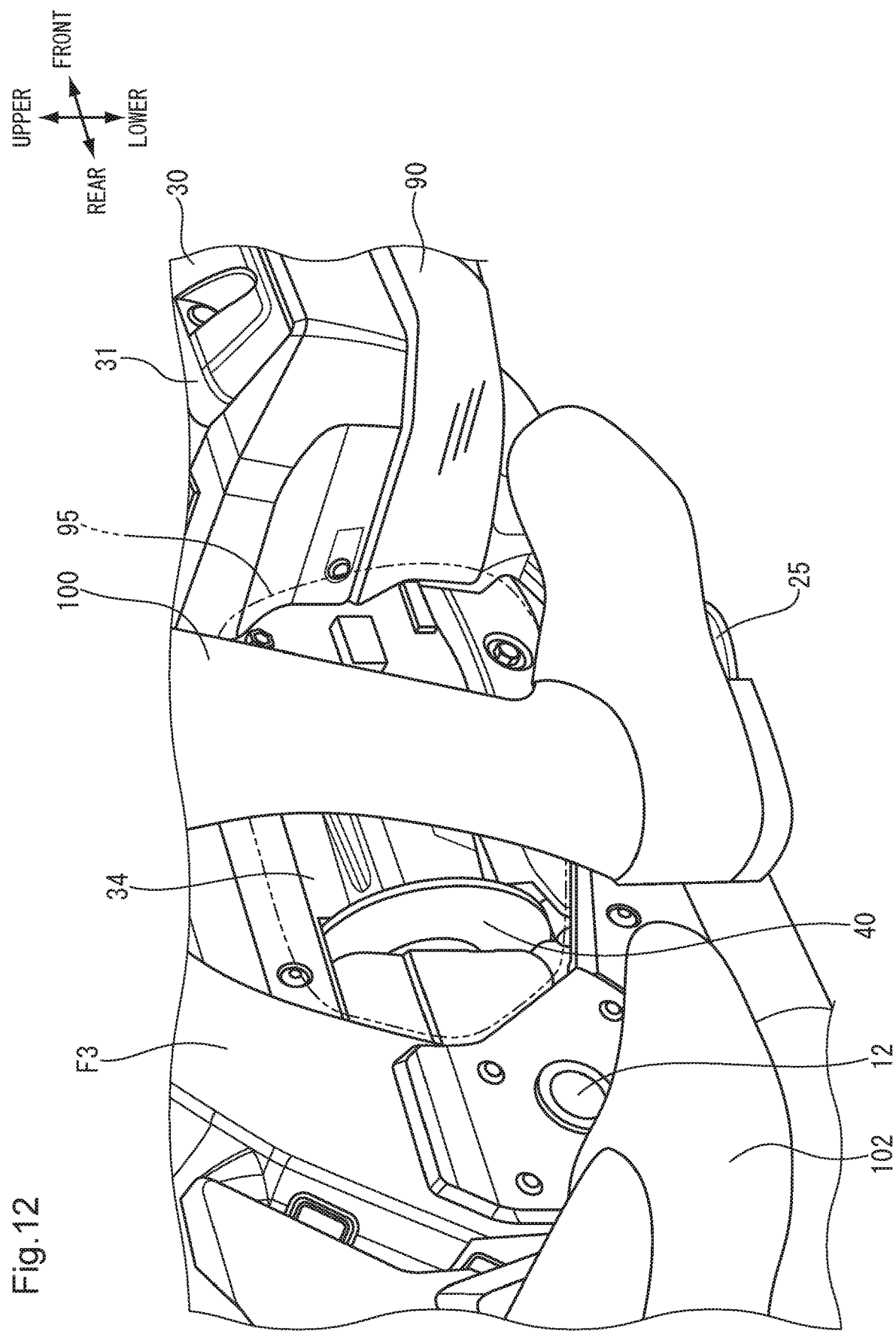
FIG. 12 is a perspective view showing a configuration of a cover member that covers the right side in the vehicle width direction of the rear wheel brake disk.
Figure 13:
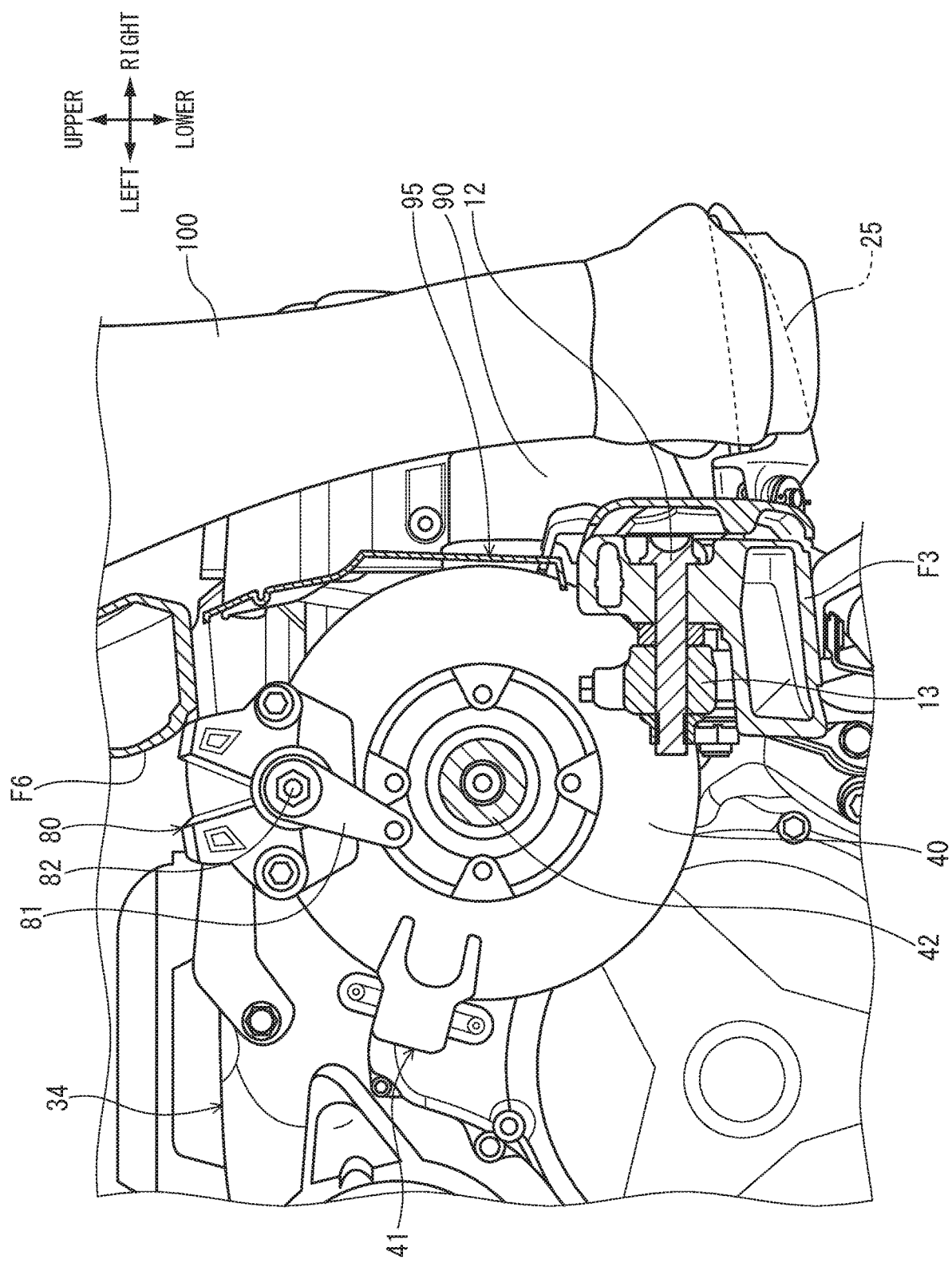
FIG. 13 is a cross-sectional view showing the shape of the cover member.

FIG. 12 is a perspective view showing a configuration of a cover member 95 that covers the right side in the vehicle width direction of the rear wheel brake disk 40. Also, FIG. 13 is a cross-sectional view showing the shape of the cover member 95. Since the position of the output shaft 42 with respect to the transmission case 34 is set to be close to the outer side in the vehicle width direction matching the arm portion of the swing arm 13, when the rear wheel brake disk 40 has such outside diameter of securing a sufficient braking force, it is probable that a part of the rear wheel brake disk 40 may protrude to the outer side in the vehicle width direction of the transmission case 34. According to the present embodiment, a part of the rear wheel brake disk 40 comes to be exposed to the inner side in the vehicle width direction of a right foot 100 of the rider placed on the foot placing step 25.

According to the present embodiment, the cover member 95 formed of a thin plate member of a hard resin and the like is attached to the right side in the vehicle width direction of the transmission case 34. According to this cover member 95, the right foot 100 of the rider can be prevented from touching the rear wheel brake disk 40, and the brake dust generated at the time of braking can be prevented from being scattered to the right side in the vehicle width direction. Thus, a right foot 102 of the passenger sitting on the rear seat also can be protected.

Also, by disposing the cover member 25 closely to the rear wheel brake disk 40, the air flowing from the vehicle body front to the vehicle body rear can be straightened, and the cooling effect of the rear wheel brake disk 40 also can be improved. Further, the cover member 95 can be configured to positively guide the traveling air to the rear wheel brake disk 40, the traveling air flowing through the inside or the outside of an under guard 90 that is attached to the lower portion of the cylinder heads 31 and the cylinder head covers 30. Also, the cover member may be made an exclusive use component as shown in the drawing, or may be configured to double with an external component such as the under cowl that covers the lateral side and the lower side of the power unit P.

Further, the form of the motorcycle and the power unit, the shape and structure of the body frame, the disposal position of the output shaft with respect to the transmission case, the shape and structure of the rear wheel brake disk and the rear wheel brake caliper, the shape and structure of the drive shaft, and so on are not limited to the embodiment described above, and various alterations are possible. For example, it is also possible that the output shaft of the power unit P is made to protrude to the vehicle body front side of the crankcase and the rear wheel brake disk is fixed to this protrusion portion. The rear wheel brake device related to the present invention can be applied to various saddle riding vehicles where the output shaft of the power unit is directed in the vehicle longitudinal direction.

REFERENCE SIGNS LIST

1 . . . motorcycle, 12 . . . pivot, 13 . . . swing arm, 34 . . . transmission case (case member), 40 . . . rear wheel brake disk, 41 . . . brake caliper, 42 . . . output shaft, 43 . . . universal joint, 44 . . . damper unit, 45 . . . drive shaft, 46 . . . propeller shaft, 50 . . . bracket, 60 . . . inner shaft, 61 . . . outer shaft, 62 . . . damper member, 70 . . . cooling fin, 95 . . . cover member, F . . . body frame, F2 . . . main frame, F3 . . . pivot frame, P . . . power unit, WR . . . rear wheel

The invention claimed is:

1. A rear wheel braking device for a motorcycle transmitting a drive force of a power unit of the motorcycle to a rear wheel through a drive shaft that extends in a vehicle longitudinal direction,
wherein the drive shaft includes a propeller shaft connected to a rear end of an output shaft through a universal joint, the output shaft protruding to a vehicle body rear side from a case member of the power unit, and
wherein a brake disk is attached to the output shaft, the brake disk being braked by a brake caliper,
wherein the power unit is suspended by a body frame configured to include a pair of left and right main frames, the left and right main frames extending in the vehicle longitudinal direction on an upper side of the power unit,
wherein a pivot frame is connected to a rear side of the left and right main frames, a pivot being arranged in the pivot frame, the pivot pivotally supporting a swing arm in a swingable manner, the swing arm supporting the rear wheel, and
wherein the brake caliper is disposed on a vehicle body upper side of the brake disk and in a space surrounded by the case member, the left and right main frames, and the pivot frame.

2. The rear wheel braking device for a motorcycle according to claim 1, wherein the brake caliper is fixed to a bracket arranged in the case member.

3. The rear wheel braking device for a motorcycle according to claim 2, wherein the power unit is suspended by a body frame configured to include a pair of left and right main frames, the left and right main frames extending in the vehicle longitudinal direction on an upper side of the power unit, and
wherein the brake caliper is disposed on the vehicle body upper side of the brake disk.

4. The rear wheel braking device for a motorcycle according to claim 2, wherein the brake caliper is disposed below an upper surface of the power unit.

5. The rear wheel braking device for a motorcycle according to claim 2, wherein the drive shaft includes a damper unit that connects the output shaft and the propeller shaft to each other,
wherein the damper unit includes an outer shaft and an inner shaft, a drive force being transmitted to the outer shaft from the output shaft, the inner shaft transmitting a drive force of the outer shaft to a downstream side, and
wherein a damper member is disposed between the outer shaft and the inner shaft.

6. The rear wheel braking device for a motorcycle according to claim 2, wherein a cooling fin is attached to the output shaft, the cooling fin rotating synchronously with the output shaft and cooling the brake disk.

7. The rear wheel braking device for a motorcycle according to claim 1, wherein the brake caliper is disposed below an upper surface of the power unit.

8. The rear wheel braking device for a motorcycle according to claim 5, wherein the drive shaft includes a damper unit that connects the output shaft and the propeller shaft to each other,
wherein the damper unit includes an outer shaft and an inner shaft, a drive force being transmitted to the outer shaft from the output shaft, the inner shaft transmitting a drive force of the outer shaft to a downstream side, and
wherein a damper member is disposed between the outer shaft and the inner shaft.

9. The rear wheel braking device for a motorcycle according to claim 1, wherein the drive shaft includes a damper unit that connects the output shaft and the propeller shaft to each other,
wherein the damper unit includes an outer shaft and an inner shaft, a drive force being transmitted to the outer shaft from the output shaft, the inner shaft transmitting a drive force of the outer shaft to a downstream side, and
wherein a damper member is disposed between the outer shaft and the inner shaft.

10. The rear wheel braking device for a motorcycle according to claim 9, wherein the damper capacity of the damper member is set so that a reverse rotation side thereof acting at a time of deceleration becomes smaller compared to a normal rotation side thereof acting at a time of acceleration.

11. The rear wheel braking device for a motorcycle according to claim 1, wherein a cooling fin is attached to the output shaft, the cooling fin rotating synchronously with the output shaft and cooling the brake disk.

12. The rear wheel braking device for a motorcycle according to claim 1, wherein a cover member is arranged on an outer side in a vehicle width direction of the brake disk, the cover member covering the brake disk.

* * * * *